Jan. 7, 1969   R. H. HOLCOMB   3,420,944
LEAD-IN CONDUCTOR FOR ELECTRICAL DEVICES
Filed Sept. 2, 1966
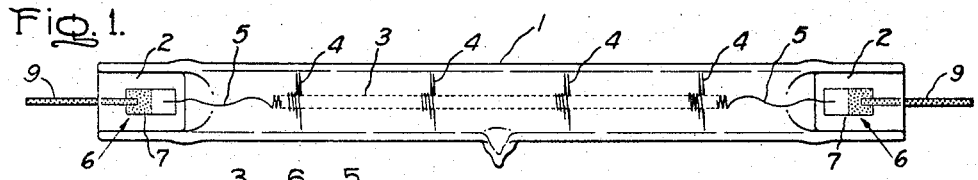
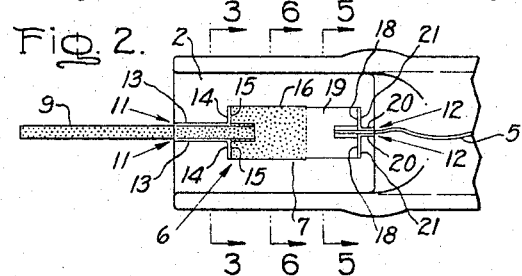
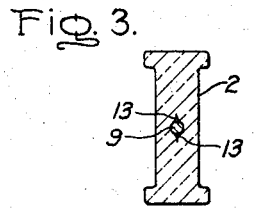
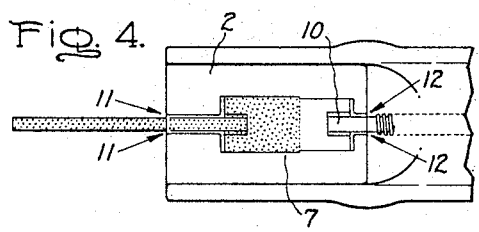
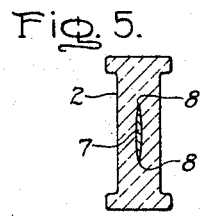
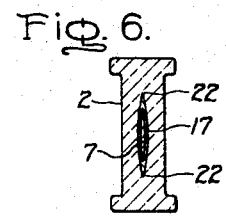
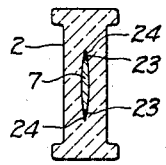
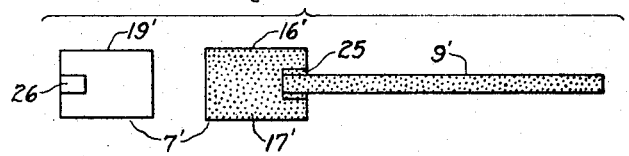
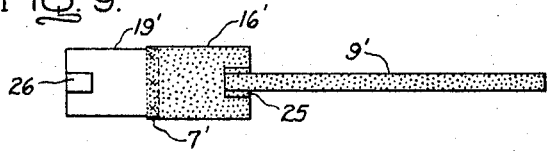
Inventor:
Richard H. Holcomb
by Otto Ticky
His Attorney United States Patent Office 3,420,944
Patented Jan. 7, 1969

3,420,944
LEAD-IN CONDUCTOR FOR ELECTRICAL
DEVICES
Richard H. Holcomb, South Euclid, Ohio, assignor to
General Electric Company, a corporation of New
York
Filed Sept. 2, 1966, Ser. No. 576,945
U.S. Cl. 174—17.05          7 Claims
Int. Cl. H05k 5/06

ABSTRACT OF THE DISCLOSURE

In an electrical device, especially a tungsten filament lamp of the halogen cycle type, having a lead-in conductor comprising an oxidizable thin retractory metal foil portion connected to outer and inner leads and hermetically sealed in a fused silica seal portion of the envelope, only the outer half of the foil is covered with a film of oxidation-resistant material. Thereby the film prevents accesss of air to the uncoated half of the foil by way of the usual small passage along the outer lead, and the uncoated half prevents access of the reactive halogen to the film by way of the usual corresponding small passage along the inner lead.

---

This invention relates generally to electrical devices having lead-in conductors which are hermetically sealed in a high silica vitreous material. More specifically, this invention relates to electrical devices having lead-in conductors including an intermediate foil portion hermetically sealed in essential fused silica and subject to exposure at one end to a highly reactive atmosphere and at the other end to oxidation from the atmosphere while the entire seal is at elevated temperature above approximately 350° C.

For purposes of convenience, and not by way of limitation, the invention will be described with particular reference to quartz halogen lamps, which comprise a tubular envelope of essentially fused silica such as quartz, or the so-called 96% silica glass known as Vycor, and having an in candescent filament connected at its ends to lead-in conductors which have portions thereof hermetically sealed in a compressed or pinch sealed portion at one or at both ends of the envelope. In lamps of this type the envelope also contains a filling of inert gas such as argon plus a small amount of a halogen such as iodine or bromine or compounds thereof.

Molybdenum is a preferred material for lead-in conductors because of its high melting point which is necessary to withstand the high temperatures incident to sealing the quartz tube about the conventional thin foil portion of the conductor to achieve a hermetic seal; however, other refractory metals such as tungsten, tantalum, platinum, iridium, etc., or alloys thereof may be used for this purpose. Hereafter, the lead-in conductor will be described with particular reference to molybdenum since this is the most commonly used refractory metal due to its availability and cost.

Lead-in conductors, having a very thin intermediate foil or ribbon portion for hermetic sealing and which have relatively heavier outer and inner lead portions attached to the foil portion, have been found to perform satisfactorily as long as the seal temperature does not exceed approximately 350° C. Above that temperature, the quartz-to-molybdenum seals have been prone to early failure due to the oxidation of the foil at its outer end which is due to the ingress of air to the foil as will presently be explained more fully. As a result, the seal life, which is usually several thousand hours for temperatures below approximately 350° C., drops to a few hundred hours or less at elevated temperatures.

Many attempts have been made to solve this problem of seal failure at elevated temperatures. One solution is to make the outer lead of platinum with the other components of molybdenum, and to place a sealing glass of low melting point around the platinum outer lead to seal the fine passage or space which is formed around the embedded part of the outer lead and thereby prevent ingress of air through the passage to the foil. This method is more fully described and claimed in Patent 3,211,826, Holcomb et al., which is assigned to the assignee of the present invention. This construction is very useful at temperatures above 500° C.; however, it does involve an increase in cost for materials and manufacture.

Another solution, which is less costly and has been found to give increased protection to the foil portion of the lead-in conductor at elevated temperatures, is to apply to the foil portion a coating or film of an oxidation-resistant material such as chromium. This construction has been used successfully in many lamps, such as quartz heat lamps, which operate with elevated seal temperatures. However, when attempts were made to use such coated foils in seals for the now well-known halogen cycle incandescent lamps, such as illustrated in Patent 2,883,571, Fridrich et al., which operates with an iodine regenerative cycle, premature failure from sagging coils or leaking seals has been experienced.

I have discovered that these premature failures are the result of a reaction between the reactive or corrosive halogen atmosphere and the coating material on the seal foil.

Accordingly, an object of the invention is to provide an improved lead-in conductor for electrical devices containing reactive atmospheres which will remain hermetically sealed in a silica member and which will provide protection from both oxidation and reactive atmosphere.

More particularly, an object of the invention is to provide an improved lead-in conductor which conforms generally to the standard refractory metal lead-in conductors, but which incorporates the preventive features of a coating which is oxidation-resistive at operating temperatures exceeding about 350° C., while still providing adequate protection of the lead-in from the reactive atmosphere of the device. A desired result is to increase seal life to that normally observed at temperatures below approximately 350° C.

Briefly stated, and in accordance with one aspect of the invention, the above-stated objects are achieved by providing a lead-in conductor assembly including an intermediate foil portion of refractory metal which is coated with an oxidation-resistive film on only a portion of its length toward the outer end of the lead-in conductor, the uncoated refractory metal foil being relatively unaffected by the reactive halogen atmosphere. In accordance with known practice, the oxidation-resistive film is sufficiently thin that it does not interfere with the hermetic seal and does not alter the contour of the foil when the hermetic seal is made. Thereby, both the coated and uncoated lengths of the foil form a hermetic seal, and the coated length prevents access of air to the uncoated length; whereas, the uncoated length prevents access of reactive halogen to the coated length.

Further features and advantages of the invention will appear from the following detailed description to be read in conjunction with the following drawing wherein like reference symbols denote corresponding parts throughout the several views.

FIG. 1 is a side view of a quartz halogen lamp embodying the invention.

FIG. 2 is a view on an enlarged seal, of one end of the lamp of FIG. 1 illustrating on an exaggerated scale, the spaces or passages around the lead-in conductors.

FIG. 3 is a cross-section view along section 3—3 of FIG. 2 further illustrating the passage left around the outer end of the lead-in conductor after pinch sealing.

FIG. 4 is an enlarged view of one end of a quartz halogen lamp illustrating the passages when a modified form of inner lead wire connection is made between the foil portion and the filament.

FIG. 5 is a cross-section along 5—5 of FIG. 2 showing the contour of the intermediate foil portion of the lead-in conductor embedded in the quartz.

FIG. 6 is a cross-section along 6—6 of FIG. 2 illustrating the effect of applying a suitable film to the intermediate foil portion.

FIG. 7 is a cross-section of a pinch seal showing the passages left when an unsuitable material is applied to the intermediate foil portion.

FIG. 8 is a view of a partial assembly of a lead-in conductor comprising an outer lead and a two piece foil portion.

FIG. 9 is a view of an assembled lead-in conductor prior to attachment of an inner lead.

Referring to FIG. 1 of the drawing, a quartz halogen lamp illustrated therein comprises an elongated tubular envelope 1, which is preferably composed of essential fused silica such as quartz or the material known as 96% silica glass, having compressed portions or pinch seals 2 at its ends which hermetically seal the envelope from the atmosphere.

Filament 3, which is usually composed of coiled tungsten wire, extends longitudinally within the envelope and may be supported by filament supports 4, which are also preferably composed of tungsten wire. As shown in FIG. 2, straight leg portions or ends 5 of the filament serve as the inner lead portions 5 of the composite lead-in conductors 6 and are attached to the foil or foliated portion 7. The core of the foil which is preferably of molybdenum is provided with feathered-edges 8 to insure a proper hermetic seal as shown in FIG. 5. The outer lead portion 9 of the lead-in conductor 6 provides a connection to an electrical energy supply. As illustrated in FIG. 4, the inner lead portion of the lead-in conductor may be a separate heavier wire portion 10, preferably of tungsten, which connects the foil 7 to the filament 3.

The reason for seal problems in quartz or high silica content vitreous materials is illustrated in FIG. 2. A passage 11 at the outer end of the pinch seal 2 around outer lead 9 and an inner passage 12 at the inner end of the pinch seal around inner lead 5 are formed due to differences in the coefficients of expansion of the relatively heavier leads of a material such as molybdenum which has a coefficient of expansion of approximately $5.5 \times 10^{-6}$ and the quartz or essentially fused silica having a coefficient of expansion of approximately 0.5 to $2.0 \times 10^{-6}$. The necessity of using a very thin foil to maintain a hermetic seal is predicated on this difference in coefficients of expansion. Thus, the atmosphere enters the end of the lamp through the outer longitudinal passage 13 and then enters a transverse passage or space 14 where it contacts the end portion 15 of the foil 7. The transverse passage 14 may be of variable size; for example, if the foil is not tapered or feather-edged at its ends, passage 14 will extend along the entire end portion 15 of the foil 16; however, even if the end is tapered, the access of air to the foil is made possible because of a void or passage due to the relative bulk of metal at the joint where the outer lead is attached to the foil. Because of passage 11, at elevated temperatures, that is, temperatures in excess of 350° C., an oxide buildup occurs at the end of a conventional molybdenum foil, and after repeated heating-cooling cycles, the quartz cracks exposing the foil. The exposed foil heats up excessively, oxidizes rapidly and fuses which causes an open circuit in the lead-in conductor with consequent lamp failure. Another possibility is that a leak in the foil due to oxidation may permit oxygen to penetrate to the interior of the envelope and destroy the filament.

Therefore, in accordance with the invention (see FIG. 2), the outer end section or length 16 of the foil 7 is coated with a film of oxidation-resistive material 17 (FIG. 6) such as chromium, nickel, nickel-chromium alloy, molybdenum-disilicide or any other material which is oxidation-resistive and when applied to the foil 7 will maintain the hermetic seal.

In a similar manner, the foil 7 is exposed at its inner end to the atmosphere in the interior of the envelope 1. As shown in FIG. 2, the highly reactive halogen component in the envelope 1 can reach the other end portion 18 of the inner end section or length 19 of the foil by way of the longitudinal passage 20 around inner lead 5 and the transverse passage 21. The presence of an oxidation-resistive film 17 on the entire foil including the inner end section 19 results in destruction of the seal by reaction of the film with the reactive atmosphere, in much the same manner as the outer end of the foil is destroyed by the air if not protected at elevated temperatures.

Thus, in accordance with the invention, the inner end section 19 of the foil 7 is not provided with a film of oxidation-resistive material and consists merely of a refractory metal such as molybdenum.

The thickness of film 17 on the outer end section 16 of the foil 7 is such that it will provide ample protection from oxidation for the designed lamp life and also will allow a hermetic seal to be formed. In this connection the thickness must be such that it does not destroy the contour of the feather-edged foil. As shown in FIG. 5, the feathered edges 8 of foil 7 assure the formation of a hermetic seal completely about its cross-section. In FIG. 6, the sharp outwardly projecting edges 22 of the coating maintain a smooth tapered contour of the foil portion 7. A problem arises when coatings are applied; most coating materials melt at the high sealing temperature required to soften the envelope and press it around the foil. Thus, a desirable coating is one, as shown in FIG. 6, which does not destroy the feather-edged contour of the foil when the seal is made. Films of chromium, nickel, nickel-chromium alloy, molybdenum-disilicide, or other similar materials, when applied to foils, may be used to achieve a hermetic seal and retain the basic contour of the foil.

If a material is used as the oxidation-resistive film 17 which destroys the feather-edge of the foil, as shown in FIG. 7, as when the coating material alloys with the feathered-edge at point 23 to form a thick edge, a void or passage 24 is created lengthwise of the foil due to the difference between the coefficient of expansion of the alloy and the quartz; hence, a hermetic seal is not produced since the air has direct access to the envelope.

As an example of satisfactory thickness of the film 17, a conventional 500-watt quartz halogen lamp, which has a lamp life of approximately 2,000 hours and a maximum foil thickness of about 1 to 1.5 mls, has been found to require a film thickness of at least $\frac{1}{10}$ of a mil and a maximum of approximately $\frac{3}{10}$ of a mil. At a thickness of less than .1 mil the seal will not last for the rated lamp life; however, if the designed lamp life were than 2,000 hours a proportional change in film thickness would be permissible. A film thickness greater than .3 mil should be avoided if air-tight seals are to be formed. In tests of lead-in conductors comprising the invention, the average seal life has been found to increase at 450° C. from about 60 hours to 5,000 hours; at 500° C. from about 200 to 2,800 hours; at 55° C. from about 100 to 825 hours; and at 600° C. from about 50 to 643 hours.

Regarding the relative lengths of outer section 16 and the inner section 19 of the foil 7, generally speaking, these sections need only be sufficient length to hermetically isolate one from the other. Thus, the oxidation-resistive film 17 on the outer section 16 might possibly be a very small strip just sufficient to form a completely hermetic seal and block access of air to the inner uncoated section 19 of the foil 7.

By way of example of a suitable construction comprising a two-piece foil, and illustrated in FIG. 8, an outer lead 9' is attached to a foil 7' on which a thin diffusion film 17' of chromium has been vapor deposited and to which a platinum tab 25 preferably has been welded. In a preferred form, the chromium is vapor-deposited on the completed assembly of lead 9' and foil 7'. This has the added advantage of protecting the outer lead 9' from oxidation, and particularly the joint between the lead 9' and the foil 7'. The outer foil section 16' is approximately 5 mm. in length and approximately 0.9 to 1.1 mils thick. The inner foil section 19' also comprises an etched molybdenum ribbon of approximately .9 to 1.1 mils in thickness, and 4½ mm. long. Section 19' also preferably includes a welding tab 26 to facilitate welding thereto of the end of the filament (FIG. 2) or the inner lead 5 (FIG. 3). As shown in FIG. 9, the two component parts of the foil are tack welded at several points. This overlap welding reduces the overall length of the composite foil 7' to approximately 8 mm.

A single-piece foil may be used by depositing the oxidation-resistive film on the entire foil and then dissolving the film off the inner section. Another method is to mask a portion of the foil, namely, the inner section 19, while depositing the oxidation-resistive film on the outer section 16.

What I claim as new and desire to secure by Letters Patent of the United States is:

1. An electrical device having a sealed envelope including a seal portion of essentially fused silica and containing an inner filling of a reactive atmosphere, and a lead-in conductor comprising a thin foil portion of refractory metal hermetically sealed in said seal portion and subject to oxidation at elevated temperatures above approximately 350° C.,
   a relatively heavier outer lead portion connected to the outer end of said foil portion and extending therefrom through the seal portion to the exterior with a slight space between the silica and the part of said outer lead portion enclosed thereby with consequent access of ambient air through said space to the said outer end of the foil,
   a relatively heavier inner lead portion connected to the inner end of said foil portion and extending therefrom through the seal portion to the envelope interior with a slight space between the silica and the part of said inner lead portion enclosed thereby with consequent access of reactive atmosphere through said space to the inner end of said foil,
   a film of oxidation-resistant material covering the entire surface of an outer end portion only of said foil, the remainder of said foil consisting of the bare refractory metal.

2. An electrical device having a lead-in conductor as defined in claim 1 and in which said film is a material selected from the group consisting of chromium, nickel, alloys of chromium and nickel, and molybdenum-disilicide.

3. An electrical device having a lead-in conductor as defined in claim 1 and wherein the refractory metal of said foil is molybdenum and said film is chromium.

4. An electrical device having a lead-in conductor as defined in claim 1 and in which said reactive atmosphere includes a halogen vapor.

5. An electrical device having a lead-in conductor as defined in claim 3 and in which said reactive atmosphere includes a halogen vapor.

6. An electrical device including a lead-in conductor as defined in claim 1 and in which approximately one-half the length of said foil is provided with said film of oxidation-resistant material.

7. An electrical device including a lead-in conductor as defined in claim 1 and wherein the oxidation-resistant material also covers the said outer lead portion.

References Cited

UNITED STATES PATENTS 2,883,571 4/1959 Fridrich et al. ____ 313—222 X
3,012,167 12/1961 Poole.
3,105,867 10/1963 Meijer _____ 174—50.64

LEWIS H. MYERS, Primary Examiner.

DAVID A. TONE, Assistant Examiner.

U.S. Cl. X.R.

174—50.64; 313—222, 223